(12) United States Patent
Kumawat et al.

(10) Patent No.: US 11,373,171 B2
(45) Date of Patent: Jun. 28, 2022

(54) METHOD AND SYSTEM FOR PREVENTION OF LOST CURRENCY IN BLOCKCHAIN NETWORKS TO MISSING WALLETS

(71) Applicant: MASTERCARD INTERNATIONAL INCORPORATED, Purchase, NY (US)

(72) Inventors: Jaipal Singh Kumawat, Rajasthan (IN); Shubham Kumar, Haryana (IN); Apoorva Dixit, Roorkee (IN); Aditya Koduri, Haryana (IN); Chandan Garg, Haryana (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 366 days.

(21) Appl. No.: 16/749,499

(22) Filed: Jan. 22, 2020

(65) Prior Publication Data
US 2021/0224792 A1 Jul. 22, 2021

(51) Int. Cl.
*G06Q 20/36* (2012.01)
*G06Q 20/40* (2012.01)
*H04L 9/06* (2006.01)
*H04L 9/32* (2006.01)

(52) U.S. Cl.
CPC ....... *G06Q 20/3674* (2013.01); *G06Q 20/401* (2013.01); *G06Q 20/4016* (2013.01); *H04L 9/0618* (2013.01); *H04L 9/0643* (2013.01); *H04L 9/3247* (2013.01); *G06Q 2220/00* (2013.01); *H04L 2209/38* (2013.01); *H04L 2209/56* (2013.01)

(58) Field of Classification Search
CPC ............. G06Q 20/3674; G06Q 20/401; G06Q 20/4016; G06Q 2220/00; H04L 9/0618; H04L 9/0643; H04L 9/3247; H04L 2209/38; H04L 2209/56
USPC .......................................................... 705/67
See application file for complete search history.

(56) References Cited

U.S. PATENT DOCUMENTS

| | | | |
|---|---|---|---|
| 2016/0342978 A1* | 11/2016 | Davis | G06Q 20/0655 |
| 2019/0087893 A1* | 3/2019 | Pellew | G06Q 40/06 |
| 2019/0156301 A1* | 5/2019 | Bentov | G06Q 20/405 |
| 2019/0205932 A1* | 7/2019 | Ericson | G06Q 20/0658 |
| 2019/0392406 A1* | 12/2019 | Deshpande | G06F 21/602 |
| 2020/0051361 A1* | 2/2020 | Cui | G07F 7/10 |
| 2020/0366480 A1* | 11/2020 | Noonan | H04L 9/0861 |

(Continued)

FOREIGN PATENT DOCUMENTS

KR 20210008702 A * 1/2021 ............. G08B 21/18

*Primary Examiner* — James D Nigh
(74) *Attorney, Agent, or Firm* — Buchanan Ingersoll & Rooney PC

(57) ABSTRACT

A method for ensuring precedence for the processing of a blockchain transaction to prevent loss of cryptographic currency includes receiving a new blockchain transaction by a blockchain node in a blockchain network, confirming the new blockchain transaction including identifying a precedence transaction that was previously conducted and stored in the blockchain that involves both blockchain wallets included in the new blockchain transaction, including the new blockchain transaction in a new block that is generated, and distributing the new block to additional nodes in the blockchain network for confirmation and addition to the blockchain.

16 Claims, 6 Drawing Sheets

(56) References Cited

U.S. PATENT DOCUMENTS

2021/0049589 A1\* 2/2021 Keskar .................. G06Q 40/04
2021/0097528 A1\* 4/2021 Wang .................... H04L 9/0825

\* cited by examiner

METHOD AND SYSTEM FOR PREVENTION OF LOST CURRENCY IN BLOCKCHAIN NETWORKS TO MISSING WALLETS

FIELD

The present disclosure relates to ensuring precedence for the processing of a blockchain transaction to prevent loss of cryptographic currency, specifically the use of past transactions or empty transactions to establish precedence for a proposed blockchain transaction to ensure there is no currency being sent to an inaccessible or unknown wallet to prevent loss of the currency.

BACKGROUND

Blockchain was initially created as a storage mechanism for use in conducting payment transactions with a cryptographic currency. Using a blockchain provides a number of benefits, such as decentralization, distributed computing, transparency regarding transactions, and yet also providing anonymity as to the individuals or entities involved in a transaction. Transactions typically operate in a blockchain by having cryptographic currency transferred from one electronic wallet to another, while the wallet owners or operators remain anonymous. However, the recipient wallet is never validated by any blockchain node when a transaction is submitted, confirmed, and added to the blockchain. As a result, a typographical error or other problem could result in currency being transmitted from a wallet owner to an "empty" or "missing" wallet, where such a wallet may not exist. The result is that the currency is effectively lost, as there is no wallet or wallet owner associated with the address that can generate a digital signature suitable to effect another transfer of that currency.

In such an error, a wallet owner may lose all or a substantial amount of their currency. In addition, if the first wallet owner is attempting to make a payment to a second wallet owner, but a typographical or other error results in their currency being lost, the first wallet owner may still be responsible for effecting another transaction, which may be detrimental to the first wallet owner or may even be more currency than the first wallet owner can afford. Due to the limitations on blockchains, there is no recourse for either wallet owner and no ability to recover the lost cryptocurrency. Thus, there is a need for a technical system that can prevent the transfer of cryptocurrency to a missing or otherwise incorrect blockchain wallet.

SUMMARY

The present disclosure provides a description of systems and methods for ensuring precedence for the processing of a blockchain transaction to prevent loss of cryptographic currency. The blockchain network discussed herein has nodes that require precedence to be established for any proposed blockchain transaction, where precedence is established through a past transaction involving the same two blockchain wallets. Requiring a past transaction ensures that currency is not being transmitted to an inaccessible or otherwise incorrect wallet. Such precedence can be established by the node reviewing past transactions to identify one involving both wallets, or having the sender identifying such a transaction when submitting the transaction. In cases where the two wallets are interacting for the first time, the blockchain node may perform an "empty" transaction, which may be a transfer from the sending wallet to the receiving wallet for a zero or nominal (e.g., due to processing fees) currency amount. The sender then has an opportunity to confirm that the precedence transaction was suitable, such as after ensuring that the intended recipient confirmed receipt of the precedence transaction. These methods can ensure that there is no loss in cryptocurrency and can do so without modification to the rules regarding the blockchain itself and its immutability.

A method for ensuring precedence for the processing of a blockchain transaction to prevent loss of cryptographic currency includes: storing, in a memory of a blockchain node in a blockchain network that manages a blockchain, the blockchain, where the blockchain includes a plurality of blocks, each of the plurality of blocks includes one or more blockchain data values, and each of the one or more blockchain data values includes at least a reference to a sending blockchain wallet and a reference to a recipient blockchain wallet; receiving, by a receiver of the blockchain node, a new blockchain transaction from a computing device, the new blockchain transaction including a digital signature of a first blockchain wallet, a recipient address of a second blockchain wallet, one or more unspent transaction outputs, and a currency amount; identifying, in the blockchain, at least one blockchain data value stored in one of the one or more blockchain data values where (i) the sending blockchain wallet is the first blockchain wallet and the recipient blockchain wallet is the second blockchain wallet, or (ii) the recipient blockchain wallet is the first blockchain wallet and the sending blockchain wallet is the second blockchain wallet; generating, by a processor of the blockchain node, a new block, where the new block includes a block header and one or more new blockchain data values, the one or more new blockchain data values including the new blockchain transaction after successful identification of the at least one blockchain data value; and transmitting, by a transmitter of the blockchain node, the generated new block to a plurality of additional nodes in the blockchain network.

Another method for ensuring precedence for the processing of a blockchain transaction to prevent loss of cryptographic currency includes: storing, in a memory of a blockchain node in a blockchain network that manages a blockchain, the blockchain, where the blockchain includes a plurality of blocks, each of the plurality of blocks includes one or more blockchain data values, and each of the one or more blockchain data values includes at least a reference to a sending blockchain wallet and a reference to a recipient blockchain wallet; receiving, by a receiver of the blockchain node, a new blockchain transaction from a computing device, the new blockchain transaction including a digital signature of a first blockchain wallet, a recipient address of a second blockchain wallet, one or more unspent transaction outputs, and a currency amount; generating, by a processor of the blockchain node, a precedence blockchain transaction, the precedence blockchain transaction including the first blockchain wallet, the second blockchain wallet, and a zero or nominal transaction amount; transmitting, by a transmitter of the blockchain node, a first new block to a plurality of additional nodes in the blockchain network, the first new block including at least the precedence blockchain transaction; receiving, by the receiver of the blockchain node, a confirmation message from the computing device; generating, by the processor of the blockchain node, a new block, where the new block includes a block header and one or more new blockchain data values, the one or more new blockchain data values including the new blockchain transaction after receiving the confirmation message; and transmitting, by the transmitter of the blockchain node, the generated new block to the plurality of additional nodes in the blockchain network.

A system for ensuring precedence for the processing of a blockchain transaction to prevent loss of cryptographic currency includes: a blockchain network that manages a blockchain; a computing device; a plurality of additional nodes in the blockchain network; and a blockchain node in the blockchain network, the blockchain node including a memory storing the blockchain, where the blockchain includes a plurality of blocks, each of the plurality of blocks includes one or more blockchain data values, and each of the one or more blockchain data values includes at least a reference to a sending blockchain wallet and a reference to a recipient blockchain wallet, a receiver receiving a new blockchain transaction from a computing device, the new blockchain transaction including a digital signature of a first blockchain wallet, a recipient address of a second blockchain wallet, one or more unspent transaction outputs, and a currency amount, a processor identifying at least one blockchain data value stored in one of the one or more blockchain data values where (i) the sending blockchain wallet is the first blockchain wallet and the recipient blockchain wallet is the second blockchain wallet, or (ii) the recipient blockchain wallet is the first blockchain wallet and the sending blockchain wallet is the second blockchain wallet, and generating a new block, where the new block includes a block header and one or more new blockchain data values, the one or more new blockchain data values including the new blockchain transaction after successful identification of the at least one blockchain data value, and a transmitter transmitting the generated new block to a plurality of additional nodes in the blockchain network.

Another system for ensuring precedence for the processing of a blockchain transaction to prevent loss of cryptographic currency includes: a blockchain network that manages a blockchain; a computing device; a plurality of additional nodes in the blockchain network; and a blockchain node in the blockchain network, the blockchain node including a memory storing the blockchain, where the blockchain includes a plurality of blocks, each of the plurality of blocks includes one or more blockchain data values, and each of the one or more blockchain data values includes at least a reference to a sending blockchain wallet and a reference to a recipient blockchain wallet, a receiver receiving a new blockchain transaction from a computing device, the new blockchain transaction including a digital signature of a first blockchain wallet, a recipient address of a second blockchain wallet, one or more unspent transaction outputs, and a currency amount, a processor of the blockchain node generating a precedence blockchain transaction, the precedence blockchain transaction including the first blockchain wallet, the second blockchain wallet, and a zero or nominal transaction amount, and a transmitter transmitting a first new block to a plurality of additional nodes in the blockchain network, the first new block including at least the precedence blockchain transaction, wherein the receiver of the blockchain node receives a confirmation message from the computing device, the processor of the blockchain node generates a new block, where the new block includes a block header and one or more new blockchain data values, the one or more new blockchain data values including the new blockchain transaction after receiving the confirmation message, and the transmitter of the blockchain node transmits the generated new block to the plurality of additional nodes in the blockchain network.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Preventing Loss of Cryptocurrency Through Transaction Precedence

Figure 1:
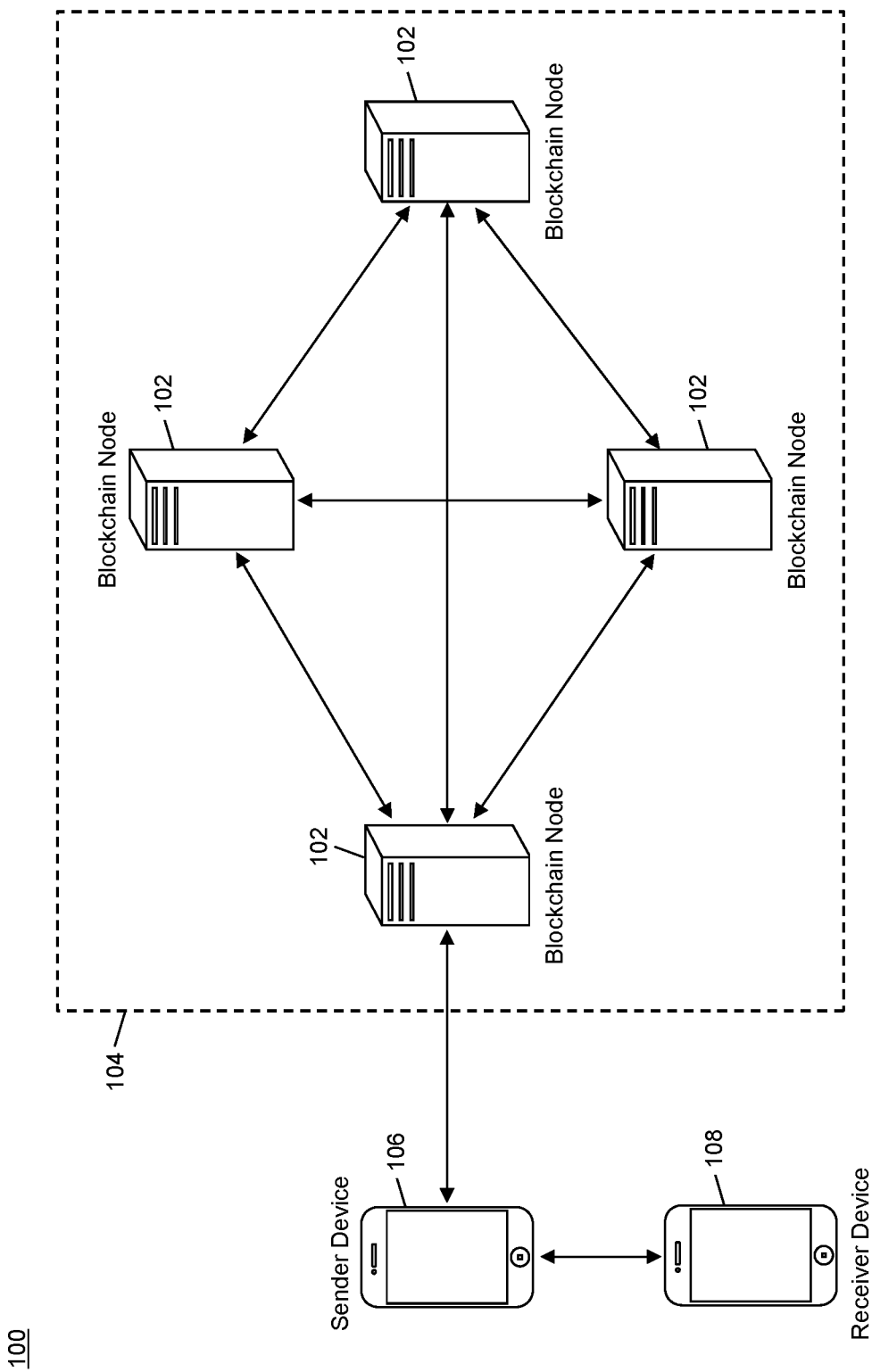
FIG. 1 is a block diagram illustrating a high-level system architecture for ensuring precedence for a blockchain transaction to prevent currency loss in a blockchain network in accordance with exemplary embodiments.

FIG. 1 illustrates a system 100 for preventing the loss of cryptographic currency in a proposed blockchain transaction through the use of precedence transactions in a blockchain network.

Figure 2:
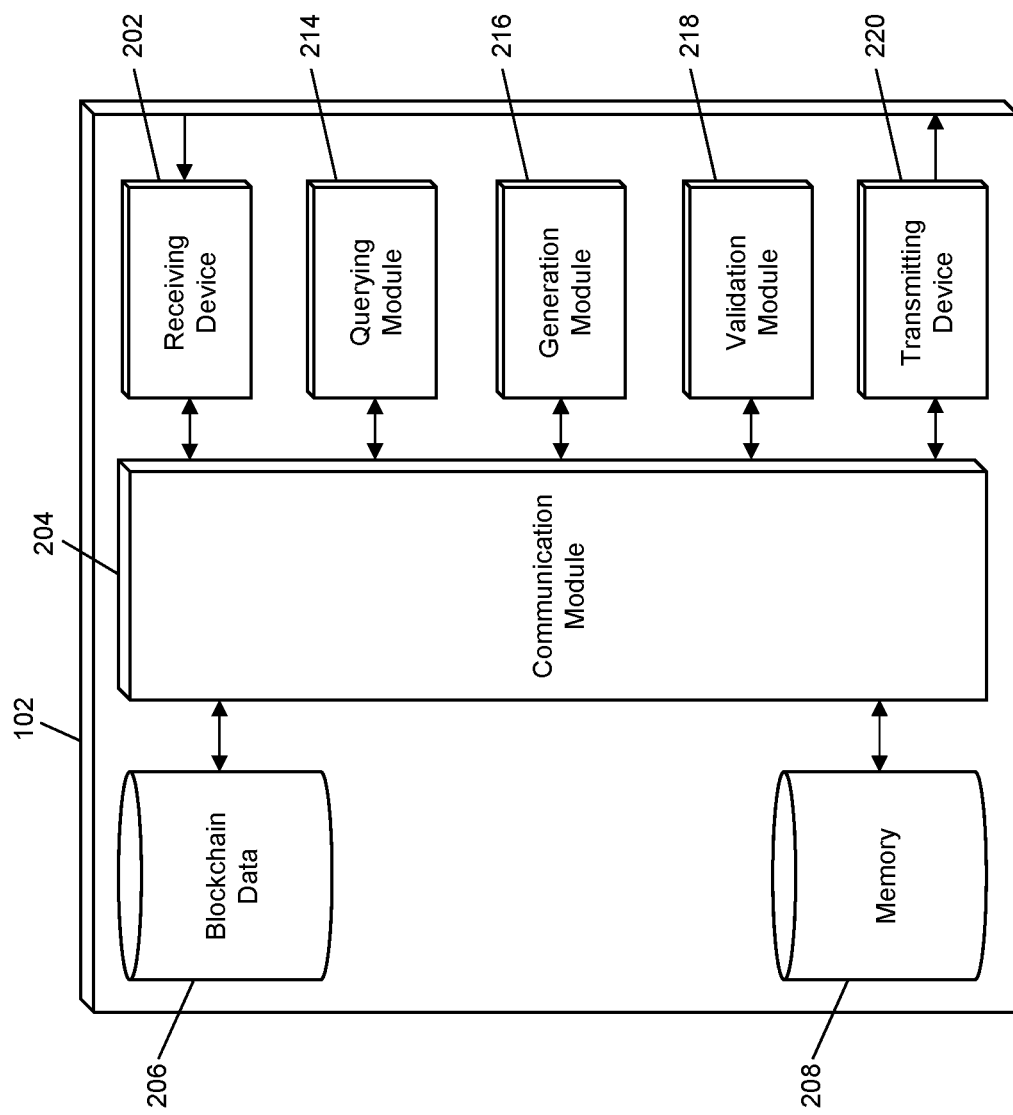
FIG. 2 is a block diagram illustrating a blockchain node of the system of FIG. 1 for preventing loss of cryptocurrency in blockchain transactions in accordance with exemplary embodiments.
Figure 6:
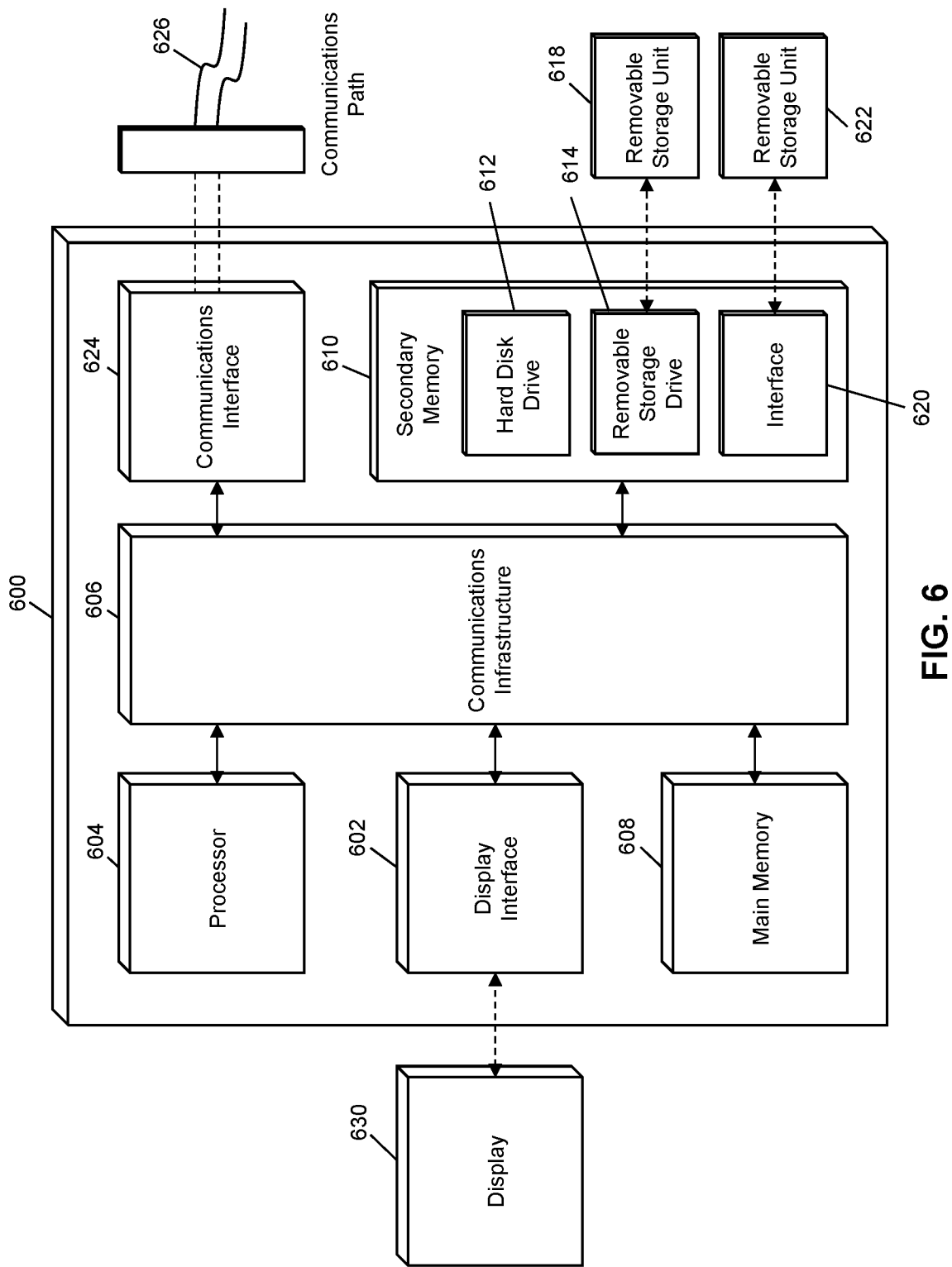
FIG. 6 is a block diagram illustrating a computer system architecture in accordance with exemplary embodiments.

The system 100 may include a blockchain network 104. The blockchain network 104 may be comprised of a plurality of blockchain nodes 102. Each blockchain node 102 may be a computing system, such as illustrated in FIGS. 2 and 6, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node 102 in the blockchain network 104 prior to the generation and addition of a new block to the blockchain in order for the change to be made permanent. Computational and communication limitations may make such a modification exceedingly difficult, if not impossible, thus rendering the blockchain immutable.

In some embodiments, the blockchain may be used to store information regarding blockchain transactions conducted between two different blockchain wallets. A blockchain wallet may include a private key of a cryptographic key pair that is used to generate digital signatures that serve as authorization by a payer for a blockchain transaction, where the digital signature can be verified by the blockchain network 104 using the public key of the cryptographic key pair. In some cases, the term "blockchain wallet" may refer specifically to the private key. In other cases, the term "blockchain wallet" may refer to a computing device (e.g., sender device 106 and receiver device 108) that stores the private key for use thereof in blockchain transactions. For instance, each computing device may each have their own private key for respective cryptographic key pairs and may each be a blockchain wallet for use in transactions with the blockchain associated with the blockchain network. Computing devices may be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain may correspond to a blockchain transaction or other storage of data, as applicable. A blockchain transaction may consist of at least: a digital signature of the sender of currency (e.g., a sender device 106) that is generated using the sender's private key, a blockchain address of the recipient of currency (e.g., a receiver device 108) generated using the recipient's public key, and a blockchain currency amount that is transferred or other data being stored. In some blockchain transactions, the transaction may also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction may also include the sender's public key, for use by an entity in validating the transaction. For the traditional processing of a blockchain transaction, such data may be provided to a blockchain node 102 in the blockchain network 104, either by the sender or the recipient. The node 102 may verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block may be validated by other nodes 102 in the blockchain network 104 before being added to the blockchain and distributed to all of the blockchain nodes 102 in the blockchain network 104 in traditional blockchain implementations. In cases where a blockchain data value may not be related to a blockchain transaction, but instead the storage of other types of data, blockchain data values may still include or otherwise involve the validation of a digital signature.

In the system 100, blockchain nodes 102 may require precedence between the sender device 106 and receiver device 108 before confirming a transaction involving the blockchain wallets of the two devices. In some cases, when the sender device 106 is submitting a new blockchain transaction to the blockchain node 102 using a suitable communication network and method, the sender device 106 may include a transaction identifier that is a unique reference identification value to a prior transaction in the blockchain. The blockchain node 102 can directly identify the prior transaction using the transaction identifier and determine if the involved wallets match the two wallets involved in the newly submitted blockchain transaction. In some cases, the blockchain node 102 may require the precedence transaction to have the sender device 106 and the receiver device 108 in the same roles. In other cases, the roles may be reversed (e.g., a transaction from the receiver device's wallet to the sender device's wallet) in the precedence transaction.

In instances where the sender device 106 does not include a transaction identifier for a prior transaction, the blockchain node 102 may attempt to identify a precedence transaction. The blockchain node 102 may review each past blockchain transaction involving the sender device 106 as either a sender or recipient and determine if the other electronic wallet involved in the blockchain transaction is associated with the receiver device 108. For example, the blockchain node 102 may use a public key of the sender device's cryptographic key pair to attempt to validate the digital signature in all past blockchain transactions, where successful validation indicates that the sender device 106 was the sender in the past transaction. Similarly, the blockchain node 102 may use an address generation algorithm to determine if a recipient address in a blockchain transaction was generated using the public key of the sender device's cryptographic key pair, which indicates that the sender device 106 was a recipient in the past transaction. For any transactions involving the sender device 106, the blockchain node 102 can similarly determine if the other wallet involved is associated with the receiver device 108 using its public key.

In cases where the newly submitted transaction involving the sender device 106 and the receiver device 108 is the first transaction involving both blockchain wallets, a precedence transaction may be performed prior to confirming the newly submitted transaction. The precedence transaction may be an empty transaction from the sender device 106 to the receiver device 108, where the transaction amount is zero or a nominal amount, such as enough to cover any fees necessary for confirmation and processing of the precedence transaction. In some cases, the fees may be paid by the blockchain node 102 or other blockchain wallet separate from the sender device 106. In some instances, the sender device 106 may be required to supply an unspent transaction output to cover the nominal amount. In some embodiments, the sender device 106 may provide an unspent transaction output as well as a digital signature generated using its private key for the precedence transaction. In other embodiments, blockchain nodes 102 may be configured to confirm a precedence transaction for a nominal amount without the validation of a digital signature, such as to decrease the processing time for the precedence transaction and to process the precedence transaction without additional involvement of the sender device 106.

The new precedence transaction may be confirmed by the blockchain node 102 and added to a new block that is generated, confirmed, and added to the blockchain. In some embodiments, the precedence transaction may include a flag or other data in the blockchain data value that indicates that the transaction is a precedence transaction. In such embodiments, when a blockchain node 102 is reviewing past transactions to identify a precedence transaction for a newly submitted transaction, the blockchain node 102 may only review blockchain data values that include a flag indicating a precedence transaction, which may increase the speed of review and decrease the time it takes for a blockchain node 102 to make its precedence determination. In some cases, precedence transactions may all be included in blocks that include only precedence transactions, where a flag indicating precedence may be stored in the block header of the block.

After the new precedence transaction is added to the blockchain, the blockchain node 102 may request confirmation from the sender device 106 for the newly submitted blockchain transaction. The sender device 106 may receive the request and may review the new block(s) on the blockchain to identify the precedence transaction. This may provide the user of the sender device 106 with the opportunity to determine if the precedence transaction involved the intended receiver device 108. For instance, if there was a typographical error in the recipient address for the receiver device 108, the blockchain wallet of the receiver device 108 may not be the recipient of the transaction. The sender device 106 may be alerted to such a situation (e.g., by the user of the receiver device 108 informing the user of the sender device 106 that they were not involved in any transaction) and may stop the newly submitted blockchain transaction and rectify any errors. In such cases, the transmission of cryptocurrency to a missing or incorrect blockchain wallet may be avoided. In some embodiments, the sender device 106 and receiver device 108 may be in communication and make such a determination automatically without user intervention. In some such embodiments, the sender device 106 may analyze the blockchain wallets involved in the precedence transaction and determine directly (e.g., using public keys of the sender device 106 and receiver device 108) if the precedence transaction is suitable, and proceed or prevent the newly submitted blockchain transaction accordingly.

Once the blockchain node 102 has identified a precedence transaction for the newly submitted blockchain transaction, and received confirmation regarding thereof from the sender device 106, if applicable, the blockchain node 102 may process the newly submitted blockchain transaction using traditional methods. For instance, the newly submitted blockchain transaction may be placed into a transaction pool of pending transactions, where it may be confirmed be one of the blockchain nodes 102 in the blockchain network 104 and then added to a new block, which may be confirmed and added to the blockchain using traditional methods. In some cases, a sender device 106 may be required to provide confirmation for all newly submitted blockchain transactions after precedence is identified, even if a new precedence transaction did not take place. In some such cases, requiring confirmation may be performed on a wallet-by-wallet basis, such as specified by a sender device 106 in a profile of its blockchain wallet, or indicated in the newly submitted blockchain transaction itself. For instance, the submission may include a flag indicating that the sender device 106 wants to be informed of the precedence transaction and confirm the precedence transaction before the newly submitted blockchain transaction is included in the pool for processing.

The methods and systems discussed herein require that a newly submitted blockchain transaction involves two wallets that were already involved in a transaction together on the blockchain, where an empty transaction is conducted between both blockchain wallets automatically if no past transaction is identified. By requiring a precedence transaction, the methods and systems discussed herein ensure that a new blockchain transaction does not result in the transfer of cryptocurrency to an unknown or missing wallet, which prevents the loss of the cryptocurrency, as the precedence establishes that the receiver device 108 exists and is known to the sender device 106. In addition, in cases where precedence is performed and determined automatically by the blockchain node 102, and the sender device 106, when applicable, the methods and systems discussed herein can be implemented without user involvement, providing the added benefits to the user of the sender device 106 without requiring any additional efforts or exertions thereby. Thus, the methods and systems discussed herein provide a significant technical improvement over traditional blockchain networks 104.

Blockchain Node

FIG. 2 illustrates an embodiment of the blockchain node 102 in the system 100. It will be apparent to persons having skill in the relevant art that the embodiment of the blockchain node 102 illustrated in FIG. 2 is provided as illustration only and may not be exhaustive to all possible configurations of the blockchain node 102 suitable for performing the functions as discussed herein. For example, the computer system 600 illustrated in FIG. 6 and discussed in more detail below may be a suitable configuration of the blockchain node 102.

The blockchain node 102 may include a receiving device 202. The receiving device 202 may be configured to receive data over one or more networks via one or more network protocols. In some instances, the receiving device 202 may be configured to receive data from other blockchain nodes 102, sender devices 106, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by other blockchain nodes 102 that may be superimposed or otherwise encoded with new transactions for confirmation, confirmed blockchain transactions, new blocks for confirmation, confirmed blocks for addition to the blockchain, messages regarding block confirmations, etc. The receiving device 202 may also be configured to receive data signals electronically transmitted by sender devices 106, which may be superimposed or otherwise encoded with new blockchain transactions, public keys, digital signatures, confirmation messages for precedence transactions, etc.

The blockchain node 102 may also include a communication module 204. The communication module 204 may be configured to transmit data between modules, engines, databases, memories, and other components of the blockchain node 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the blockchain node 102 and external components of the blockchain node 102, such as externally connected databases, display devices, input devices, etc. The blockchain node 102 may also include a processing device. The processing device may be configured to perform the functions of the blockchain node 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, validation module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The blockchain node 102 may also include a memory 208. The memory 208 may be configured to store data for use by the blockchain node 102 in performing the functions discussed herein, such as public and private keys, symmetric keys, etc. The memory 208 may be configured to store data using suitable data formatting methods and schema and may be any suitable type of memory, such as read-only memory, random access memory, etc. The memory 208 may include, for example, encryption keys and algorithms, communication protocols and standards, data formatting standards and protocols, program code for modules and application programs of the processing device, and other data that may be suitable for use by the blockchain node 102 in the performance of the functions disclosed herein as will be apparent to persons having skill in the relevant art. In some embodiments, the memory 208 may be comprised of or may otherwise include a relational database that utilizes structured query language for the storage, identification, modifying, updating, accessing, etc. of structured data sets stored therein. The memory 208 may be configured to store, for example, cryptographic keys, salts, nonces, communication information for blockchain nodes 102 and blockchain networks 104, address generation and validation algorithms, digital signature generation and validation algorithms, hashing algorithms for generating reference values, rules regarding generation of new blocks and block headers, a pool of pending transactions, precedence transaction rules and flag data, blockchain wallet data, etc.

The blockchain node 102 may also include blockchain data 206, which may be stored in the memory 208 of the blockchain node 102 or stored in a separate area within the blockchain node 102 or accessible thereby. The blockchain data 206 may include a blockchain, which may be comprised of a plurality of blocks and be associated with the blockchain network 104. In some cases, the blockchain data 206 may further include any other data associated with the blockchain and management and performance thereof, such as block generation algorithms, digital signature generation and confirmation algorithms, communication data for blockchain nodes 102, fee data, precedence transaction rules, etc.

The blockchain node 102 may include a querying module 214. The querying module 214 may be configured to execute queries on databases to identify information. The querying module 214 may receive one or more data values or query strings and may execute a query string based thereon on an indicated database, such as the memory 208 of the blockchain node 102 to identify information stored therein. The querying module 214 may then output the identified information to an appropriate engine or module of the blockchain node 102 as necessary. The querying module 214 may, for example, execute a query on the blockchain data 206 to attempt to identify a past, precedence transaction related to a newly submitted blockchain transaction using public keys of the involved sender device 106 and receiver device 108.

The blockchain node 102 may also include a generation module 216. The generation module 216 may be configured to generate data for use by the blockchain node 102 in performing the functions discussed herein. The generation module 216 may receive instructions as input, may generate data based on the instructions, and may output the generated data to one or more modules of the blockchain node 102. For example, the generation module 216 may be configured to generate new blockchain data values, new block headers, Merkle roots, new blocks, and other data for operation of the blockchain. The generation module 216 may also be configured to generate a precedence transaction for confirmation and processing in the blockchain network 104, where the precedence transaction may be generated for two blockchain wallets without involvement thereof.

The blockchain node 102 may also include a validation module 218. The validation module 218 may be configured to perform validations for the blockchain node 102 as part of the functions discussed herein. The validation module 218 may receive instructions as input, which may also include data to be used in performing a validation, may perform a validation as requested, and may output a result of the validation to another module or engine of the blockchain node 102. The validation module 218 may, for example, be configured to confirm blockchain transactions by analyzing blockchain data values in the blockchain to ensure that the sender device 106 is authorized to use the transaction outputs included in the new transaction submission and that the transaction outputs have not been previously used to transfer currency in another transaction. The validation module 218 may also be configured to validate digital signatures using public keys and suitable signature generation algorithms. The validation module 218 may be further configured to validate precedence transactions, which may be confirmed by the validation module 218 without the validation of a digital signature due to the precedence transaction being for zero or nominal transaction amount and used to establish precedence.

The blockchain node 102 may also include a transmitting device 220. The transmitting device 220 may be configured to transmit data over one or more networks via one or more network protocols. In some instances, the transmitting device 220 may be configured to transmit data to other blockchain nodes 102, sender devices 106, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to blockchain nodes 102 that are superimposed or otherwise encoded with new blockchain data values, new blocks for confirmation, confirmed blocks, messages regarding block or transaction confirmations, and other data used in the operation and management of the blockchain. The transmitting device 220 may also be configured to electronically transmit data signals to sender devices 106, which may be superimposed or otherwise encoded with confirmation requests, notifications regarding transaction processing, etc.

Process for Ensuring Precedence for a Blockchain Transaction

Figure 3:
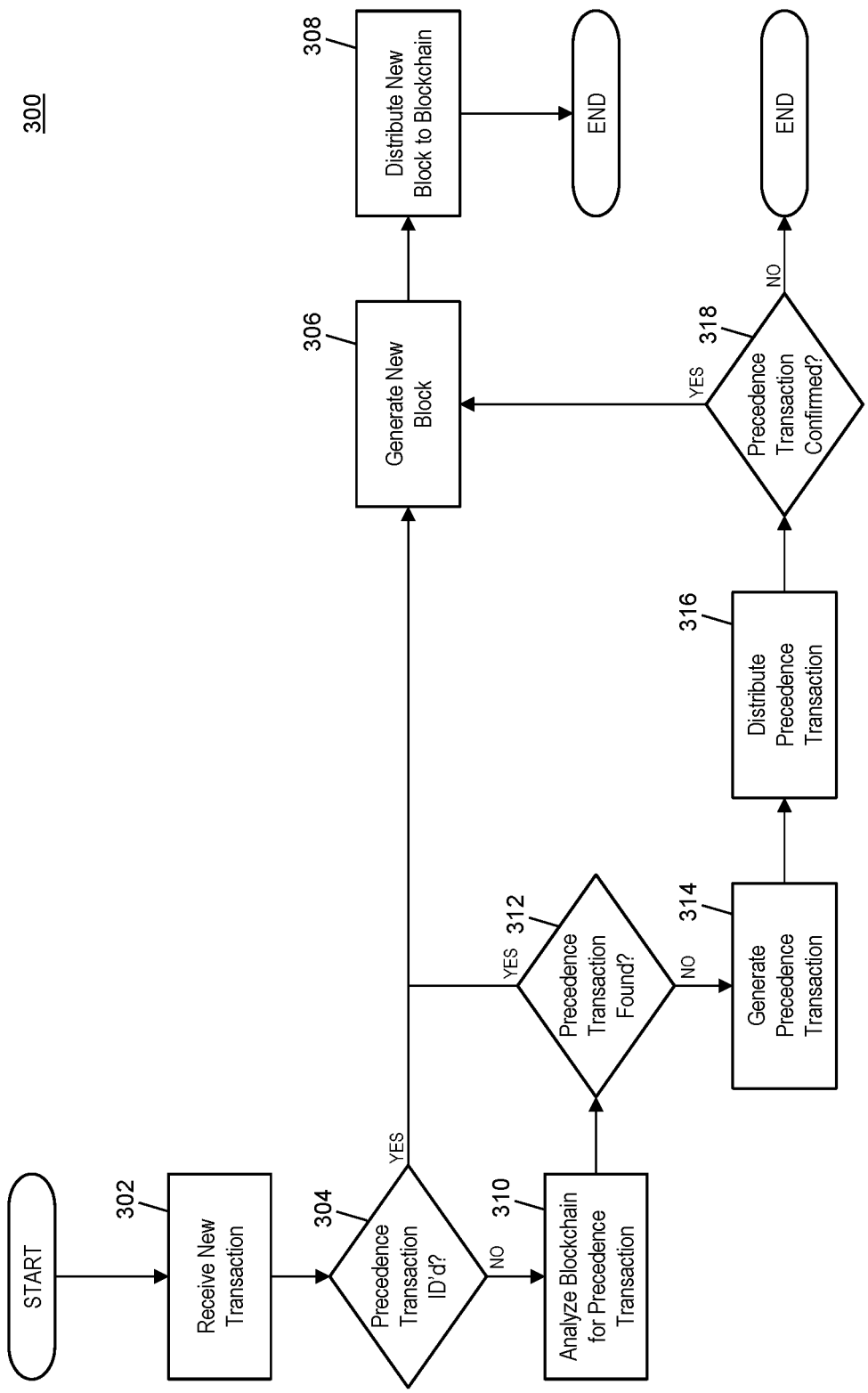
FIG. 3 is a flow diagram illustrating a process for ensuring precedence to prevent loss of cryptocurrency in a blockchain transaction as executed by the blockchain node of FIG. 2 in the system of FIG. 1 in accordance with exemplary embodiments.

FIG. 3 illustrates a process 300 for ensuring precedence for a blockchain transaction based on or requiring a prior transaction for a newly submitted blockchain transaction as executed by a blockchain node 102 in the system 100 of FIG. 1.

In step 302, the receiving device 202 of the blockchain node 102 may receive a new blockchain transaction submitted by a sender device 106, submitted using a suitable communication network and method. The new blockchain transaction may include at least a digital signature, one or more unspent transaction outputs, one or more recipient addresses, and, for each recipient address, a currency amount. In step 304, the blockchain node 102 may determine if a precedence transaction is identified in the submission received from the sender device 106.

If a transaction identifier for a precedence transaction is included in the submission, then, in step 306, the generation module 216 of the blockchain node 102 may generate a new block for the blockchain that includes a blockchain data value for the new blockchain transaction. Step 306 may include confirming the new blockchain transaction by the validation module 218 of the blockchain node 102, such as by validating the digital signature, ensuring the unspent transaction output(s) are still unspent, and ensuring that the outputs cover the currency amount(s) being transferred. In some cases, confirmation of the new blockchain transaction may include validating that the identified precedence transaction involves the two blockchain wallets involved in the new blockchain transaction. Generation of the new block may also include generation, by the generation module 216 of the blockchain node 102, of a new block that includes a blockchain data value for the new blockchain transaction as well as a block header and any additional blockchain data values. In step 308, the transmitting device 220 of the blockchain node 102 may distribute the new block to a plurality of additional blockchain nodes 102 in the blockchain network 104, where the new block may be confirmed and then added to the blockchain.

If, in step 304, no transaction identifier for a precedence transaction is included in the submission of the new blockchain transaction, then, in step 310, the querying module 214 of the blockchain node 102 may execute a query on the blockchain data 206 to attempt to identify a precedence transaction, which may be a past blockchain data value where the involved blockchain wallets include the blockchain wallet of the sender device 106 and the receiver device 108 based on the data included in the new blockchain transaction. If a precedence transaction is successfully identified in step 312, then the process 300 may proceed to step 306 where the new blockchain transaction is confirmed and included in a new block generated by the blockchain node 102.

If no precedence transaction is identified in step 312, then, in step 314, the generation module 216 of the blockchain node 102 may generate a precedence transaction. The precedence transaction may include the sender device 106 as a sender, the receiver device 108 as a recipient, and the currency amount may be a zero or nominal amount. In some cases, no digital signature may be included in the precedence transaction. In other cases, the sender device 106 may be prompted to supply a digital signature for the precedence transaction by the transmitting device 220 of the blockchain node 102. In step 316, the precedence transaction may be included in a new block that is generated by the generation module 216 of the blockchain node 102, confirmed by other blockchain nodes 102 in the blockchain network 104, and distributed to all blockchain nodes 102 for addition to the blockchain.

In step 318, the blockchain node 102 may determine if the precedence transaction is confirmed. Confirmation of the precedence transaction may include the receipt, by the receiving device 202 of the blockchain node 102, of a confirmation message from the sender device 108 that indicates that the precedence transaction was successful and is suitable (e.g., the recipient in the precedence transaction is the intended receiver device 108 for the new blockchain transaction). If the precedence transaction is not confirmed, or if the sender device 106 indicates that the precedence transaction does not involve the appropriate recipient, then the process 300 may be completed and the new blockchain transaction not processed. In such cases, the sender device 106 may be invited to submit another blockchain transaction and restart the process 300, such as with a new recipient address. If the precedence transaction is confirmed, then the process 300 may proceed to step 306 where the new blockchain transaction is confirmed and included in a new block generated by the blockchain node 102.

First Exemplary Method for Ensuring Precedence

Figure 4:
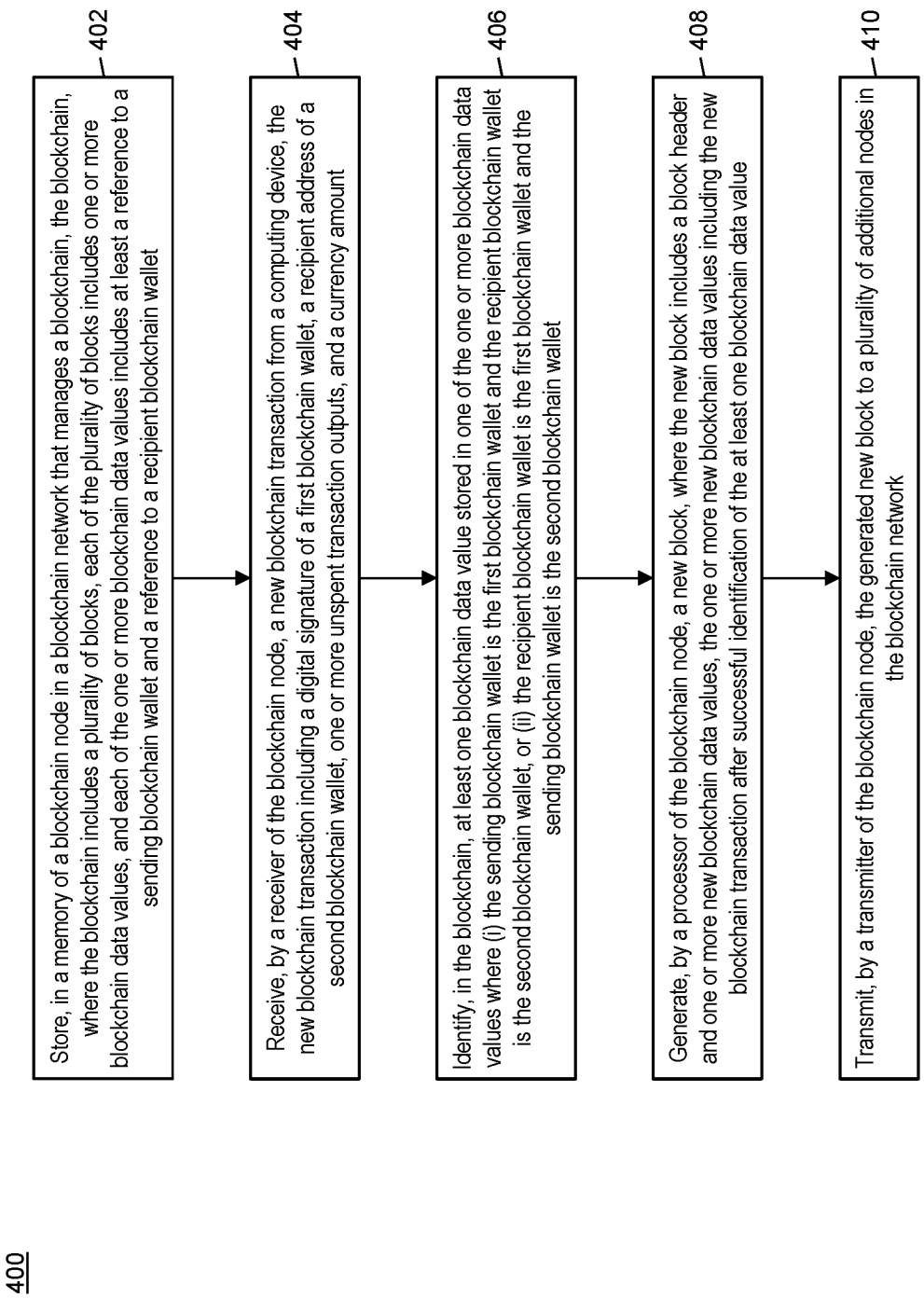
FIGS. 4 and 5 are flow charts illustrating exemplary methods for ensuring precedence for the processing of a blockchain transaction to prevent loss of cryptographic currency in accordance with exemplary embodiments.

FIG. 4 illustrates a method 400 for ensuring precedence for the processing of a blockchain transaction to prevent loss of cryptographic currency as a result of a previously processed transaction involving two blockchain wallets involved in the new blockchain transaction.

In step 402, a blockchain may be stored in a memory (e.g., blockchain data 206, memory 208, etc.) of a blockchain node (e.g., blockchain node 102) in a blockchain network (e.g., blockchain network 104) that manages the blockchain, where the blockchain includes a plurality of blocks, each of the plurality of blocks includes one or more blockchain data values, and each of the one or more blockchain data values includes at least a reference to a sending blockchain wallet and a reference to a recipient blockchain wallet. In step 404, a new blockchain transaction may be received by a receiver (e.g., receiving device 202) of the blockchain node from a computing device (e.g., sender device 106), the new blockchain transaction including a digital signature of a first blockchain wallet, a recipient address of a second blockchain wallet, one or more unspent transaction outputs, and a currency amount.

In step 406, at least one blockchain data value stored in one of the one or more blockchain data values may be identified in the blockchain where (i) the sending blockchain wallet is the first blockchain wallet and the recipient blockchain wallet is the second blockchain wallet, or (ii) the recipient blockchain wallet is the first blockchain wallet and the sending blockchain wallet is the second blockchain wallet. In step 408, a new block may be generated by a processor (e.g., generation module 216) of the blockchain node, where the new block includes a block header and one or more new blockchain data values, the one or more new blockchain data values including the new blockchain transaction after successful identification of the at least one blockchain data value. In step 410, the generated new block may be transmitted to a plurality of additional nodes in the blockchain network by a transmitter (e.g., transmitting device 220) of the blockchain node.

In one embodiment, the method 400 may further include validating, by the processor (e.g., validation module 218) of the blockchain node, the digital signature included in the new blockchain transaction using a public key of the first blockchain wallet. In some embodiments, the new blockchain transaction may include a transaction reference identifier, and the identified at least one blockchain data value may include the transaction reference identifier. In a further embodiment, the new blockchain transaction included in the one or more new blockchain data values may further include a precedence flag.

Second Exemplary Method for Ensuring Precedence

Figure 5:
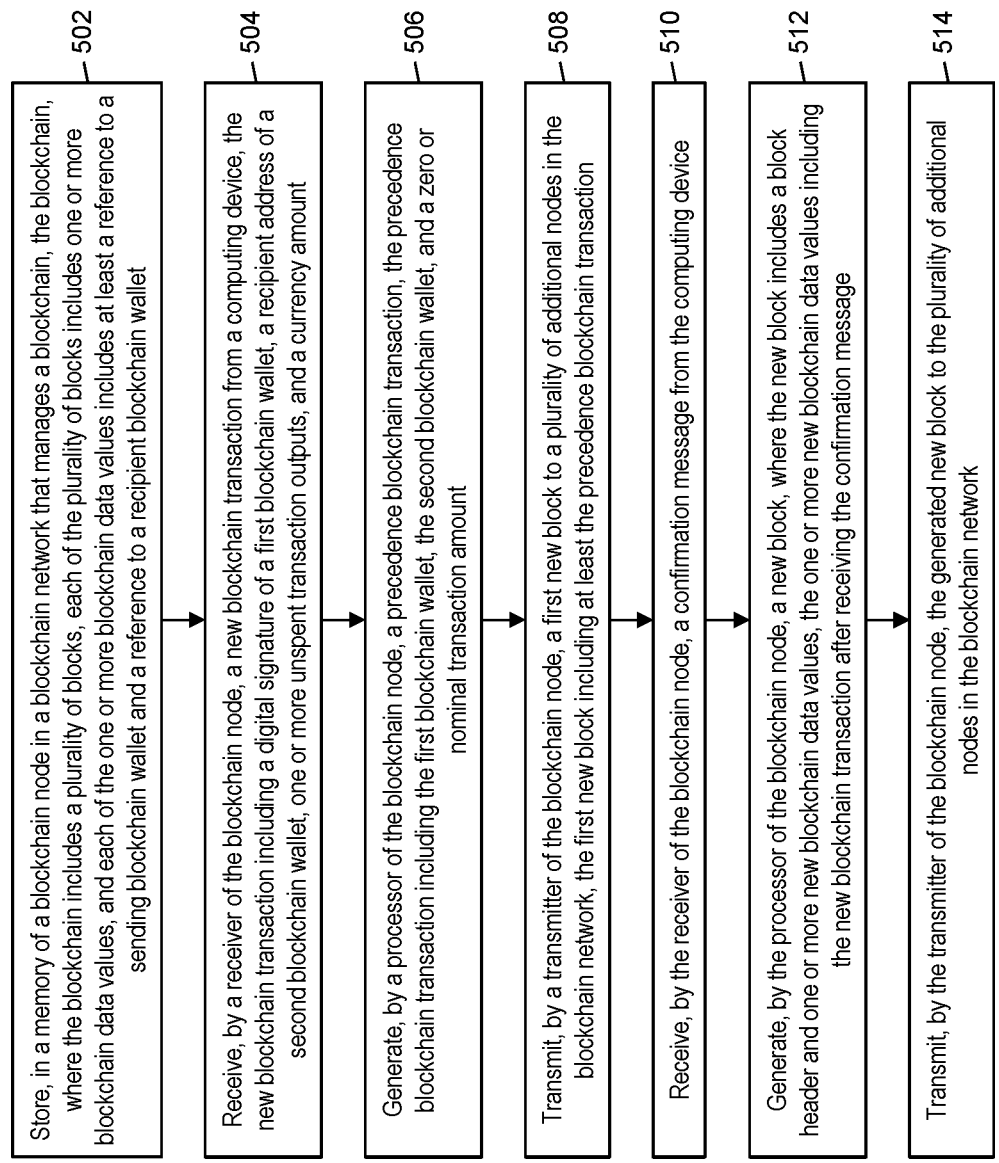

FIG. 5 illustrates a method 500 for ensuring precedence for the processing of a blockchain transaction to prevent loss of cryptographic currency involving the generation and processing of a precedence transaction prior to the processing of the new blockchain transaction.

In step 502, a blockchain may be stored in a memory (e.g., blockchain data 206, memory 208, etc.) of a blockchain node (e.g., blockchain node 102) in a blockchain network (e.g., blockchain network 104) that manages the blockchain, where the blockchain includes a plurality of blocks, each of the plurality of blocks includes one or more blockchain data values, and each of the one or more blockchain data values includes at least a reference to a sending blockchain wallet and a reference to a recipient blockchain wallet. In step 504, a new blockchain transaction may be received by a receiver (e.g., receiving device 202) of the blockchain node from a computing device (e.g., sender device 106), the new blockchain transaction including a digital signature of a first blockchain wallet, a recipient address of a second blockchain wallet, one or more unspent transaction outputs, and a currency amount.

In step 506, a precedence blockchain transaction may be generated by a processor (e.g., generation module 216) of the blockchain node, the precedence blockchain transaction including the first blockchain wallet, the second blockchain wallet, and a zero or nominal transaction amount. In step 508, a first new block may be transmitted to a plurality of additional nodes in the blockchain network by a transmitter (e.g., transmitting device 220) of the blockchain node, the first new block including at least the precedence blockchain transaction. In step 510, a confirmation message may be received by the receiver of the blockchain node from the computing device.

In step 512, a new block may be generated by the processor of the blockchain node, where the new block includes a block header and one or more new blockchain data values, the one or more new blockchain data values including the new blockchain transaction after receiving the confirmation message. In step 514, the generated new block may be transmitted by the transmitter of the blockchain node to the plurality of additional nodes in the blockchain network.

In one embodiment, the method 500 may further include validating, by the processor (e.g., validation module 218) of the blockchain node, the digital signature included in the new blockchain transaction using a public key of the first blockchain wallet. In some embodiments, the precedence blockchain transaction may further include a transaction reference identifier, and the confirmation message may include the transaction reference identifier. In one embodiment, the new blockchain transaction included in the one or more new blockchain data values may further include a precedence flag.

Computer System Architecture

FIG. 6 illustrates a computer system 600 in which embodiments of the present disclosure, or portions thereof, may be implemented as computer-readable code. For example, the blockchain nodes 102 of FIGS. 1 and 2 may be implemented in the computer system 600 using hardware, non-transitory computer readable media having instructions stored thereon, or a combination thereof and may be implemented in one or more computer systems or other processing systems. Hardware may embody modules and components used to implement the methods of FIGS. 3-5.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3-5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for ensuring precedence for the processing of a blockchain transaction to prevent loss of cryptographic currency. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for ensuring precedence for the processing of a blockchain transaction to prevent loss of cryptographic currency, comprising:
   storing, in a memory of a blockchain node in a blockchain network that manages a blockchain, the blockchain, where the blockchain includes a plurality of blocks, each of the plurality of blocks includes one or more blockchain data values, and each of the one or more blockchain data values includes at least a reference to a sending blockchain wallet and a reference to a recipient blockchain wallet;
   receiving, by a receiver of the blockchain node, a new blockchain transaction from a computing device, the new blockchain transaction including a digital signature of a first blockchain wallet, a recipient address of a second blockchain wallet, one or more unspent transaction outputs, and a currency amount;
   identifying, in the blockchain, at least one blockchain data value stored in one of the one or more blockchain data values where (i) the sending blockchain wallet is the first blockchain wallet and the recipient blockchain wallet is the second blockchain wallet, or (ii) the recipient blockchain wallet is the first blockchain wallet and the sending blockchain wallet is the second blockchain wallet;
   generating, by a processor of the blockchain node, a new block, where the new block includes a block header and one or more new blockchain data values, the one or more new blockchain data values including the new blockchain transaction after successful identification of the at least one blockchain data value; and
   transmitting, by a transmitter of the blockchain node, the generated new block to a plurality of additional nodes in the blockchain network.

2. The method of claim 1, further comprising:
   validating, by the processor of the blockchain node, the digital signature included in the new blockchain transaction using a public key of the first blockchain wallet.

3. The method of claim 1, wherein
   the new blockchain transaction includes a transaction reference identifier, and
   the identified at least one blockchain data value includes the transaction reference identifier.

4. The method of claim 3, wherein the new blockchain transaction included in the one or more new blockchain data values further includes a precedence flag.

5. A method for ensuring precedence for the processing of a blockchain transaction to prevent loss of cryptographic currency, comprising:
   storing, in a memory of a blockchain node in a blockchain network that manages a blockchain, the blockchain, where the blockchain includes a plurality of blocks, each of the plurality of blocks includes one or more blockchain data values, and each of the one or more blockchain data values includes at least a reference to a sending blockchain wallet and a reference to a recipient blockchain wallet;
   receiving, by a receiver of the blockchain node, a new blockchain transaction from a computing device, the new blockchain transaction including a digital signature of a first blockchain wallet, a recipient address of a second blockchain wallet, one or more unspent transaction outputs, and a currency amount;
   generating, by a processor of the blockchain node, a precedence blockchain transaction, the precedence blockchain transaction including the first blockchain wallet, the second blockchain wallet, and a zero or nominal transaction amount;
   transmitting, by a transmitter of the blockchain node, a first new block to a plurality of additional nodes in the blockchain network, the first new block including at least the precedence blockchain transaction;
   receiving, by the receiver of the blockchain node, a confirmation message from the computing device;
   generating, by the processor of the blockchain node, a new block, where the new block includes a block header and one or more new blockchain data values, the one or more new blockchain data values including the new blockchain transaction after receiving the confirmation message; and transmitting, by the transmitter of the blockchain node, the generated new block to the plurality of additional nodes in the blockchain network.

6. The method of claim 5, further comprising:
validating, by the processor of the blockchain node, the digital signature included in the new blockchain transaction using a public key of the first blockchain wallet.

7. The method of claim 5, wherein
the precedence blockchain transaction further includes a transaction reference identifier, and
the confirmation message includes the transaction reference identifier.

8. The method of claim 5, wherein the new blockchain transaction included in the one or more new blockchain data values further includes a precedence flag.

9. A system for ensuring precedence for the processing of a blockchain transaction to prevent loss of cryptographic currency, comprising:
a blockchain network that manages a blockchain;
a computing device;
a plurality of additional nodes in the blockchain network; and
a blockchain node in the blockchain network, the blockchain node including
a memory storing the blockchain, where the blockchain includes a plurality of blocks, each of the plurality of blocks includes one or more blockchain data values, and each of the one or more blockchain data values includes at least a reference to a sending blockchain wallet and a reference to a recipient blockchain wallet,
a receiver receiving a new blockchain transaction from a computing device, the new blockchain transaction including a digital signature of a first blockchain wallet, a recipient address of a second blockchain wallet, one or more unspent transaction outputs, and a currency amount,
a processor
identifying at least one blockchain data value stored in one of the one or more blockchain data values where (i) the sending blockchain wallet is the first blockchain wallet and the recipient blockchain wallet is the second blockchain wallet, or (ii) the recipient blockchain wallet is the first blockchain wallet and the sending blockchain wallet is the second blockchain wallet, and
generating a new block, where the new block includes a block header and one or more new blockchain data values, the one or more new blockchain data values including the new blockchain transaction after successful identification of the at least one blockchain data value, and
a transmitter transmitting the generated new block to a plurality of additional nodes in the blockchain network.

10. The system of claim 9, wherein the processor of the blockchain node validates the digital signature included in the new blockchain transaction using a public key of the first blockchain wallet.

11. The system of claim 9, wherein
the new blockchain transaction includes a transaction reference identifier, and
the identified at least one blockchain data value includes the transaction reference identifier.

12. The system of claim 11, wherein the new blockchain transaction included in the one or more new blockchain data values further includes a precedence flag.

13. A system for ensuring precedence for the processing of a blockchain transaction to prevent loss of cryptographic currency, comprising:
a blockchain network that manages a blockchain;
a computing device;
a plurality of additional nodes in the blockchain network; and
a blockchain node in the blockchain network, the blockchain node including
a memory storing the blockchain, where the blockchain includes a plurality of blocks, each of the plurality of blocks includes one or more blockchain data values, and each of the one or more blockchain data values includes at least a reference to a sending blockchain wallet and a reference to a recipient blockchain wallet,
a receiver receiving a new blockchain transaction from a computing device, the new blockchain transaction including a digital signature of a first blockchain wallet, a recipient address of a second blockchain wallet, one or more unspent transaction outputs, and a currency amount,
a processor of the blockchain node generating a precedence blockchain transaction, the precedence blockchain transaction including the first blockchain wallet, the second blockchain wallet, and a zero or nominal transaction amount, and
a transmitter transmitting a first new block to a plurality of additional nodes in the blockchain network, the first new block including at least the precedence blockchain transaction, wherein
the receiver of the blockchain node receives a confirmation message from the computing device,
the processor of the blockchain node generates a new block, where the new block includes a block header and one or more new blockchain data values, the one or more new blockchain data values including the new blockchain transaction after receiving the confirmation message, and
the transmitter of the blockchain node transmits the generated new block to the plurality of additional nodes in the blockchain network.

14. The system of claim 13, wherein the processor of the blockchain node validates the digital signature included in the new blockchain transaction using a public key of the first blockchain wallet.

15. The system of claim 13, wherein
the precedence blockchain transaction further includes a transaction reference identifier, and
the confirmation message includes the transaction reference identifier.

16. The system of claim 13, wherein the new blockchain transaction included in the one or more new blockchain data values further includes a precedence flag.

* * * * *